United States Patent
Yamashita et al.

(10) Patent No.: US 12,006,983 B2
(45) Date of Patent: Jun. 11, 2024

(54) ASSEMBLING METHOD AND ASSEMBLING DEVICE FOR HUB BEARING

(71) Applicant: NTN Corporation, Osaka (JP)

(72) Inventors: Tatsuto Yamashita, Shizuoka (JP); Tomoaki Sawada, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 18/026,214

(22) PCT Filed: Aug. 27, 2021

(86) PCT No.: PCT/JP2021/031579
§ 371 (c)(1),
(2) Date: Mar. 14, 2023

(87) PCT Pub. No.: WO2022/064955
PCT Pub. Date: Mar. 31, 2022

(65) Prior Publication Data
US 2023/0332649 A1    Oct. 19, 2023

(30) Foreign Application Priority Data
Sep. 23, 2020   (JP) ................................ 2020-158599

(51) Int. Cl.
*F16C 43/06*  (2006.01)
*F16C 19/38*  (2006.01)
*F16C 43/04*  (2006.01)

(52) U.S. Cl.
CPC ............ *F16C 43/06* (2013.01); *F16C 19/388* (2013.01); *F16C 43/045* (2013.01); *F16C 2326/02* (2013.01)

(58) Field of Classification Search
CPC ...... F16C 43/06; F16C 19/388; F16C 43/045; F16C 2326/02; F16C 19/386
See application file for complete search history.

(56) References Cited

U.S. PATENT DOCUMENTS 8,061,038 B2 * 11/2011 Shimizu ............... F16C 43/065
29/898.07
2001/0016092 A1   8/2001 Komaba et al.
(Continued)

FOREIGN PATENT DOCUMENTS

JP   2000-065049   3/2000
JP   2002-283805   10/2002
(Continued)

OTHER PUBLICATIONS

International Preliminary Report on Patentability and Written Opinion of the International Searching Authority issued Mar. 28, 2023, in International (PCT) Application No. PCT/JP2021/031579, with English translation.
(Continued)

*Primary Examiner* — Lee A Holly
(74) *Attorney, Agent, or Firm* — Wenderoth, Lind & Ponack, L.L.P.

(57) ABSTRACT

To obtain a second assembly, first, an outer ring and first roller cassette of a first assembly are supported by a first support tool and a hub wheel of the first assembly is supported by a second support tool, and then the second support tool is moved upward, so that a roller support surface of the second support tool is introduced to the inside of the first roller cassette in the radial direction. Then, after a first seal member is attached to the outer ring, the second support tool is moved downward in accordance with the re-insertion of a cylindrical portion of the hub wheel into the inner periphery of the outer ring, so that a first inner raceway surface is inside of the first roller cassette in the radial direction while the roller support surface is ejected to the lower side of the first roller cassette.

4 Claims, 10 Drawing Sheets

(56) References Cited

U.S. PATENT DOCUMENTS

2006/0137186 A1* 6/2006 Seo .................... F16C 33/46
                                              29/898.07
2008/0222893 A1 9/2008 Shimizu et al.

FOREIGN PATENT DOCUMENTS

| JP | 2008-223976 | 9/2008 |
| JP | 4513295 | 7/2010 |

OTHER PUBLICATIONS

International Search Report issued Oct. 19, 2021, in International (PCT) Application No. PCT/JP2021/031579, with English translation.

* cited by examiner

ASSEMBLING METHOD AND ASSEMBLING DEVICE FOR HUB BEARING

TECHNICAL FIELD

The present invention relates to an assembling method and assembling device for a hub bearing that rotatably supports a wheel with respect to a vehicle body in a vehicle such as an automobile.

BACKGROUND ART

Examples of hub bearings include a first generation in which double-row rolling bearings are used in combination, a second generation in which a vehicle body mounting flange is integrally provided on the outer ring of a rolling bearing, and a third generation in which an inner raceway surface (which is one of the two inner raceway surfaces and is on the wheel mounting flange side) is formed on the outer peripheral surface of a hub wheel having the wheel mounting flange. As the bearing portion of the hub bearing, a bearing having a large load capacity and capable of receiving both a radial load and an axial load, such as a double-row ball bearing or a double-row tapered roller bearing, is generally employed.

For example, FIG. 1 of JP 2000-65049 A (Patent Literature 1) describes a third-generation hub bearing in which a double-row tapered roller bearing is employed as a bearing portion. That is, the hub bearing includes a hub wheel integrally having a cylindrical portion and a flange (wheel mounting flange), an inner ring attached to the outer peripheral surface of the cylindrical portion of the hub wheel, and an outer ring integrally having a vehicle body mounting flange. Conical first and second outer raceway surfaces formed on the inner peripheral surface of the outer ring face a first inner raceway surface formed on the outer peripheral surface of the hub wheel and a second inner raceway surface formed on the outer peripheral surface of the inner ring, respectively, and a plurality of tapered rollers are rollably arranged between these raceway surfaces. The hub bearing also includes a first cage that holds the plurality of tapered rollers arranged between (in a first raceway defined by) a first outer raceway surface and the first inner raceway surface, a second cage that holds the plurality of tapered rollers arranged between (in a second raceway defined by) the second outer raceway surface and the second inner raceway surface, and first and second seal members that seal openings at one end and the other end, respectively, of the outer ring.

In the third-generation hub bearing having the above configuration, the wheel mounting flange is integrally provided on the hub wheel, and one (first inner raceway surface) of the two inner raceway surfaces is directly formed. Therefore, the third-generation hub bearing has fewer components than the first-generation and second-generation hub bearings and is considered to be advantageous for cost reduction. However, it has been pointed out that the above structure considered to be advantageous for cost reduction causes other problems, such as reduced ease of assembly (see, for example, Patent Literature 2 below).

That is, in the hub wheel of the third-generation hub bearing, since the wheel mounting flange and the first inner raceway surface are arranged adjacent to each other in the axial direction, it is substantially impossible to attach a first seal member disposed on the flange side after inserting the cylindrical portion of the hub wheel into the inner periphery of the outer ring (after combining the hub wheel and the outer ring). Therefore, in this case, an assembly procedure is employed in which, first, a roller cassette including the plurality of tapered rollers arranged in the first raceway and the first cage holding the tapered rollers is attached to the first outer raceway surface of the outer ring, then the first seal member is attached to one end of the outer ring in the axial direction, and then the cylindrical portion of the hub wheel is inserted into the inner periphery of the outer ring. However, if this assembly procedure is employed, the tapered rollers fall off from the first cage (the tapered rollers move radially inward) until the insertion of the cylindrical portion of the hub wheel into the inner periphery of the outer ring progresses to some extent, and a large amount of labor is required for the assembly operation. In order to solve this problem, in Patent Literature 1, a dedicated product having a structure capable of engaging with the tapered rollers in the radial direction is employed as the first cage. However, since this dedicated cage is more expensive than general cages (general-purpose cages) widely distributed, the effectiveness of cost reduction obtained by employing the hub wheel having the above structure is reduced.

Therefore, Patent Literature 2 proposes an assembling method in which a combination product (assembly) of an outer ring, a roller cassette, a first seal member, and a retaining ring that supports a plurality of tapered rollers contained in the roller cassette from radially inside is produced, and then the hub wheel is combined with the assembly while the retaining ring is pushed out axially outside by the hub wheel.

CITATIONS LIST

Patent Literature

Patent Literature 1: JP 2000-65049 A
Patent Literature 2: JP 4513295 B2

SUMMARY OF INVENTION

Technical Problems

According to the assembling method for a hub bearing as described in Patent Literature 2, even if a general-purpose cage is employed as the first cage, it is possible to prevent the tapered rollers from falling off from the first cage during assembly. However, in this assembling method, it is necessary to accurately produce a retaining ring, which is a separate member from the components of the hub bearing, and to accurately incorporate the retaining ring into the above assembly, and therefore, labor and cost are required. In addition, since it is necessary to provide an additional recovery mechanism for recovering the retaining ring that falls off as the assembly and the hub wheel are combined, the increase in the complexity and size of the assembling device and the associated high cost are inevitable. Therefore, it is insufficient as a cost reduction measure for the third-generation hub bearing, and there is room for improvement.

In view of the above circumstances, an object of the present invention is to provide a technical means capable of contributing to cost reduction of a so-called third-generation hub bearing.

Solutions to Problems

The present invention devised to achieve the above object is an assembling method for a hub bearing including an outer ring having an inner peripheral surface on which a first outer raceway surface and a second outer raceway surface are formed, an inner ring having an outer peripheral surface on which a second inner raceway surface facing the second outer raceway surface is formed, a hub wheel integrally having a cylindrical portion having an outer peripheral surface on which a first inner raceway surface facing the first outer raceway surface is formed, and a flange that is disposed on one side of the first inner raceway surface in an axial direction, a roller cassette including a plurality of tapered rollers that are interposed between the first outer raceway surface and the first inner raceway surface and a cage that holds the plurality of tapered rollers at predetermined circumferentially spaced intervals, and a seal member that seals an opening at one end of the outer ring in the axial direction. This method includes a first step for obtaining a first assembly in which the outer ring, the hub wheel, and the roller cassette are combined, and a second step for obtaining a second assembly in which the first assembly and the seal member are combined. In the second step, (1) the outer ring and roller cassette of the first assembly in a vertical orientation with the outer ring below the flange of the hub wheel are supported from below by a first support tool and the cylindrical portion of the hub wheel of the first assembly is supported from below by a second support tool that can be raised and lowered relative to the first support tool while being restricted from separating from the first support tool, (2) then the second support tool is moved upward relative to the first support tool in accordance with the separation of the hub wheel from the first assembly that is in the vertical orientation, so that a cylindrical roller support surface provided on the second support tool is introduced to an inside of the roller cassette in a radial direction, and (3) then, after the seal member is attached to the outer ring, the second support tool is moved downward relative to the first support tool in accordance with the re-insertion of the cylindrical portion of the hub wheel into an inner periphery of the outer ring, so that the first inner raceway surface is introduced to the inside of the roller cassette in the radial direction while the roller support surface is ejected below the roller cassette.

Figure 2:
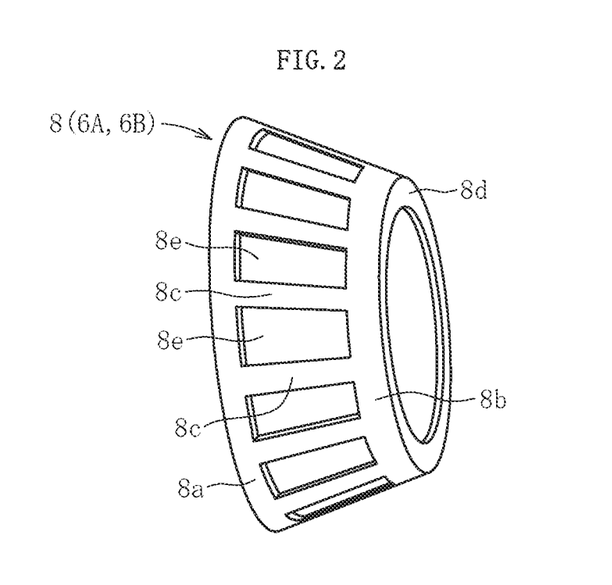
FIG. 2 is a schematic perspective view of a general-purpose cage constituting a first roller cassette.
Figure 3:
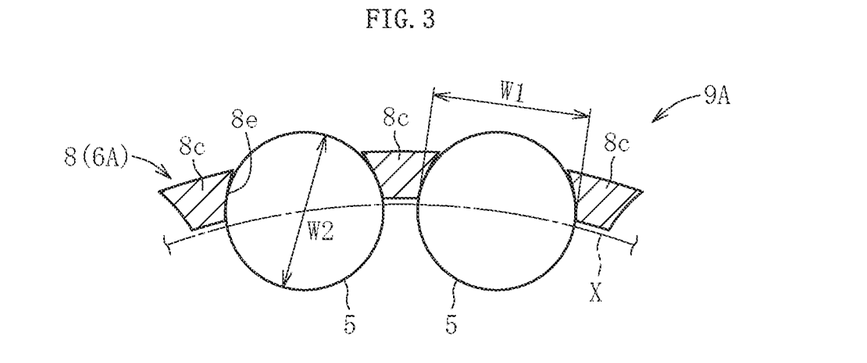
FIG. 3 is a partial transverse sectional view of the first roller cassette.

With the assembling method for a hub bearing (third-generation hub bearing) according to the present invention, even if a general-purpose cage 8 having the structure illustrated in FIGS. 2 and 3 is employed instead of the dedicated cage described in Patent Literature 1 as a cage, it is possible to perform the assembly operation of the hub bearing while preventing the tapered rollers from falling off from the cage until the second assembly which structurally, substantially eliminates the possibility that the tapered rollers fall off radially inward of the cage is produced.

Specifically, first, in the first step for obtaining the first assembly in which the outer ring, the hub wheel, and the roller cassette are combined, the tapered rollers can be prevented from falling off by (the first inner raceway surface formed on) the outer peripheral surface of the cylindrical portion of the hub wheel disposed radially inward of the roller cassette. In addition, in the above operation stage (1) of the second step, the tapered rollers can be prevented from falling off by the outer peripheral surface (first inner raceway surface) of the cylindrical portion of the hub wheel as in the first step, in the above operation stage (2) of the second step, the tapered rollers can be prevented from falling off by the outer peripheral surface (first inner raceway surface) of the cylindrical portion of the hub wheel and the roller support surface of the second support tool, and in the above operation stage (3) of the second step, the tapered rollers can be prevented from falling off by the roller support surface of the second support tool and the outer peripheral surface (first inner raceway surface) of the cylindrical portion of the hub wheel. Therefore, it is possible to simultaneously achieve a reduction in component costs by employing the general-purpose cage as a cage and achieve improved ease of assembly by preventing the tapered rollers from falling off during the assembly operation.

In addition, since the support tools (first and second support tools) used in the second step supports, from below, the first assembly in which the outer ring, the hub wheel, and the roller cassette are combined, the time and effort for assembling as in the case of employing the retaining ring described in Patent Literature 2 is eliminated. Furthermore, since the second support tool provided with the roller support surface moves vertically relative to the first support tool while being restricted from separating from the first support tool, there is no need to provide a retaining ring recovery step or recovery device which is indispensable when the retaining ring is employed. From the above, the assembling method for a hub bearing according to the present invention can contribute to cost reduction of the hub bearing.

In the above configuration, as a technical means for vertically moving the second support tool relative to the first support tool, for example, it is conceivable to interpose an elastic member between the first support tool and the second support tool to stretch and deform the elastic member.

It is preferable that the roller cassette is supported from below by the first support tool in the second step by supporting the cage (only) without supporting the plurality of tapered rollers.

In addition, the above object can be similarly achieved even when the assembling device for a hub bearing according to the present invention is employed. That is, the present invention is an assembling device for a hub bearing including the above-described outer ring, inner ring, hub wheel, roller cassette, and seal member, the assembling device including: a first support tool that supports, from below, the outer ring and roller cassette of a first assembly in which the outer ring, the hub wheel, and the roller cassette are combined in a vertical orientation with the outer ring below the flange of the hub wheel; and a second support tool that can be raised and lowered relative to the first support tool while being restricted from separating from the first support tool, and supports, from below, the cylindrical portion of the hub wheel of the first assembly that is in the vertical orientation. The second support tool is moved upward relative to the first support tool in accordance with the separation of the hub wheel from the first assembly that is in the vertical orientation, until a roller support surface provided on an outer peripheral surface of the second support tool is disposed radially inward of the roller cassette, and the second support tool is moved downward relative to the first support tool in accordance with the re-insertion of the cylindrical portion of the hub wheel into an inner periphery of the outer ring so that the roller support surface is ejected below the roller cassette.

If the assembling device for a hub bearing has the above configuration, the assembling method for a hub bearing according to the present invention can be employed, so that it is possible to enjoy the same advantageous effects as when the assembling method for a hub bearing according to the present invention is employed.

Advantageous Effects of Invention

From the above, according to the present invention, it is possible to contribute to cost reduction of a so-called third-generation hub bearing.

DESCRIPTION OF EMBODIMENT

Hereinafter, an embodiment of the present invention will be described with reference to the drawings.

Figure 1:
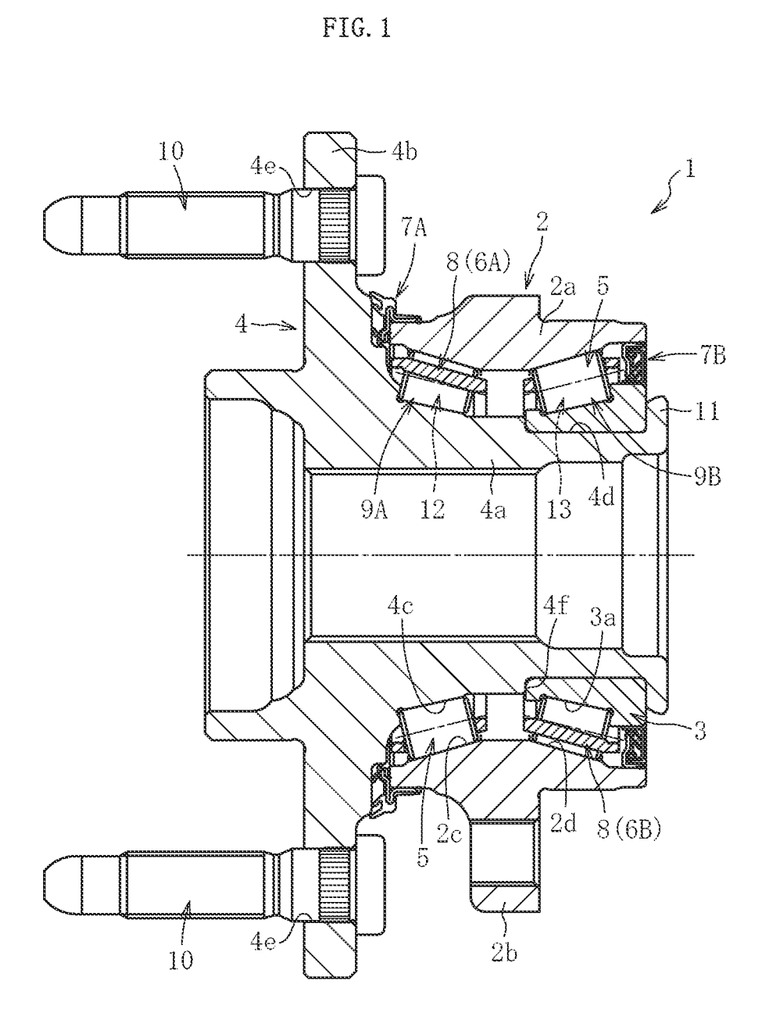
FIG. 1 is a longitudinal sectional view of a hub bearing.

First, an example of a hub bearing obtained by applying an assembling method according to the present invention will be described with reference to FIG. 1. A hub bearing 1 illustrated in the drawing includes, as main components, an outer ring 2, an inner ring 3, a hub wheel 4, a first roller cassette 9A and second roller cassette 9B serving as "roller cassettes" in the present invention, and a first seal member 7A and second seal member 7B serving as "seal members" in the present invention. An annular space defined between the inner ring 3 and the hub wheel 4, and the outer ring 2 is filled with a lubricant (not illustrated) such as grease.

The outer ring 2 integrally has a cylindrical portion 2a and a flange 2b that extends radially outward from the outer peripheral surface of the cylindrical portion 2a. The flange 2b functions as a mounting portion for mounting the outer ring 2 to a vehicle body (knuckle extending from the suspension device of the vehicle body) (not illustrated). A first outer raceway surface 2c and a second outer raceway surface 2d are formed on the inner peripheral surface of the cylindrical portion 2a. The first outer raceway surface 2c has an inclined surface (conical surface) shape with one axial end (outboard side) located further radially outward than the other axial end (inboard side), and the second outer raceway surface 2d has a conical surface shape with one axial end located further radially inward than the other axial end. Note that the "outboard side" and the "inboard side" refer to the outer side and the inner side, respectively, of the vehicle in the vehicle width direction in a state where the hub bearing 1 is mounted to the vehicle. In FIG. 1, the left side of the drawing is the outboard side, and the right side of the drawing is the inboard side.

The hub wheel 4 integrally has a cylindrical portion 4a, the outer peripheral surface of which is formed with a conical first inner raceway surface 4c facing the first outer raceway surface 2c of the outer ring 2 and a cylindrical inner ring attachment surface 4d, and a flange 4b that extends radially outward from the outer peripheral surface of the cylindrical portion 4a. The flange 4b and the inner ring attachment surface 4d are provided on one side and the other side, respectively, of the first inner raceway surface 4c in the axial direction. A bolt attachment hole 4e to which a bolt member 10 is attached is formed in the flange 4b, and the hub wheel 4 is mounted to a wheel (not illustrated) using the bolt member 10. Although not illustrated, the shaft portion of an outer joint member constituting a constant velocity universal joint is coupled to the center hole of the hub wheel 4 so as to enable torque transmission.

A second inner raceway surface 3a having a conical surface shape and facing the second outer raceway surface 2d of the outer ring 2 is formed on the outer peripheral surface of the inner ring 3 attached to the inner ring attachment surface 4d of the hub wheel 4. The inner ring 3 is fixed to the hub wheel 4 by being held from both sides in the axial direction between a swaged portion 11 formed at the other axial end of the cylindrical portion 4a of the hub wheel 4 and a shoulder surface (stepped surface provided between the first inner raceway surface 4c and the inner ring attachment surface 4d) 4f of the hub wheel 4.

The first roller cassette 9A serving as a "roller cassette" includes a plurality of tapered rollers 5 that are interposed in a first raceway 12 between the first outer raceway surface 2c and the first inner raceway surface 4c, and a first cage 6A that holds the plurality of tapered rollers 5 at predetermined circumferentially spaced intervals. The second roller cassette 9B includes a plurality of tapered rollers 5 that are interposed in a second raceway 13 between the second outer raceway surface 2d and the second inner raceway surface 3a, and a second cage 6B that holds the plurality of tapered rollers 5 at predetermined circumferentially spaced intervals.

As the first cage 6A and the second cage 6B, a general cage (general-purpose cage 8) widely distributed as a cage for tapered rollers is employed. As illustrated in FIG. 2, for example, the general-purpose cage 8 integrally includes a large-diameter annular portion 8a and a small-diameter annular portion 8b spaced apart in the axial direction, a plurality of columns 8c connecting both annular portions 8a and 8b, and an annular rib 8d protruding inwardly in the radial direction from the radially inner end of the small-diameter annular portion 8b. A trapezoidal window-shaped pocket 8e for accommodating (holding) the tapered roller 5 is formed between two circumferentially adjacent columns 8c, 8c.

FIG. 3 is a partial transverse sectional view of the first roller cassette 9A including the first cage 6A (general-purpose cage 8) and the plurality of tapered rollers 5. As illustrated in the figure, the columns 8c of the general-purpose cage 8 are arranged further outward in the radial direction than a circular track X that is formed by connecting the centers (rolling centers) of the tapered rollers 5 accommodated in the pocket 8e. In addition, the opening dimension (distance between the two circumferentially adjacent columns 8c, 8c) of the pocket 8e decreases gradually toward the outside in the radial direction, and the opening dimension W1 of the inner end in each section of the pocket 8e in the axial direction is smaller than the diameter W2 in each section of the corresponding tapered roller 5 in the axial direction. With the above configuration, in the first roller cassette 9A, the tapered rollers 5 do not move (fall off) radially outward, but depending on the orientation of the first roller cassette 9A, the tapered rollers 5 may fall off radially inward. The second roller cassette 9B is similar to the first roller cassette 9A.

The first seal member 7A seals an opening at one axial end of the outer ring 2, and the second seal member 7B seals an opening at the other axial end of the outer ring 2. This prevents external leakage of the grease filled in the annular space between the outer ring 2, the inner ring 3, and the hub wheel 4, and intrusion of foreign matter into the annular space. As the first seal member 7A and the second seal member 7B, either a so-called contact type or non-contact type may be employed, but here, the contact type is employed for both the seal members 7A and 7B.

Figure 4:
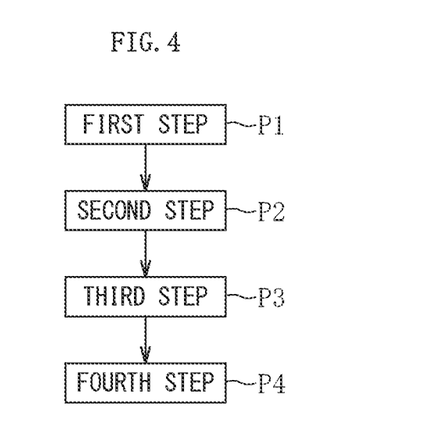
FIG. 4 is a flowchart illustrating a procedure of assembly steps for the hub bearing illustrated in FIG. 1.
Figure 13:
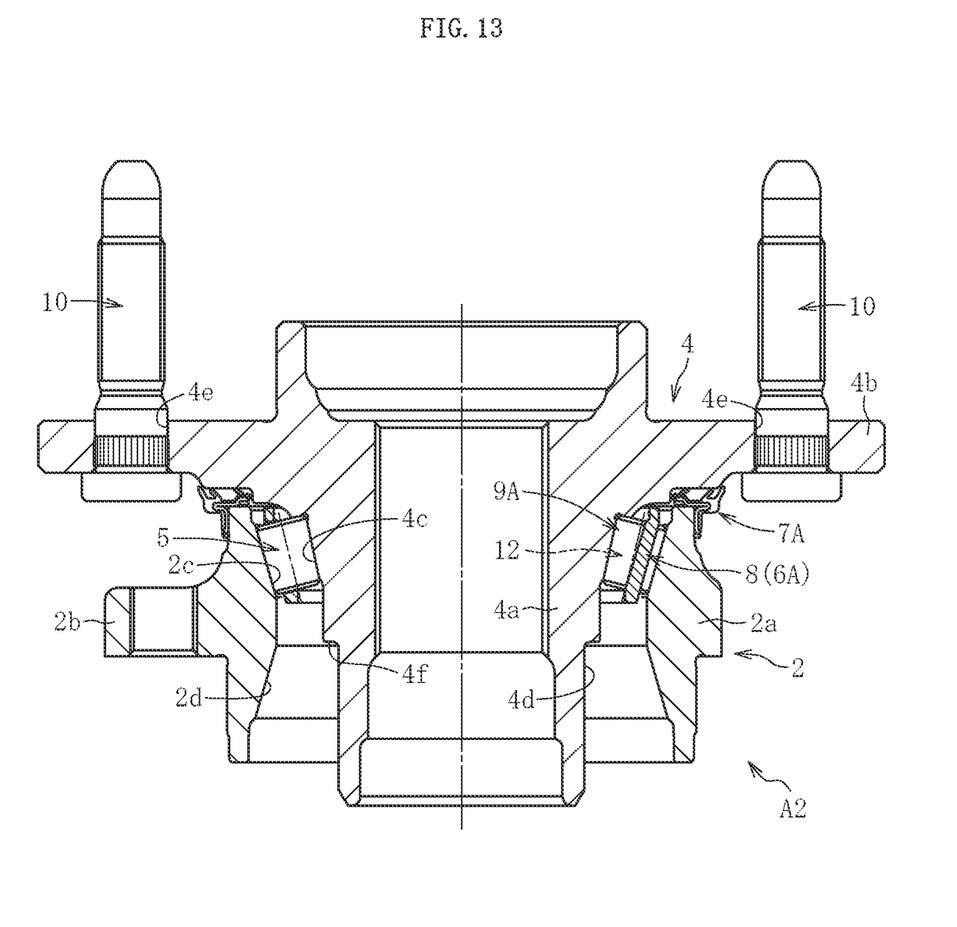
FIG. 13 is a longitudinal sectional view of a second assembly.

As illustrated in FIG. 4, the hub bearing 1 having the above configuration is assembled through the following steps in order:
- a first step P1 for obtaining a first assembly A1 (see FIG. 8) in which the outer ring 2, the hub wheel 4, and the first roller cassette 9A are combined;
- a second step P2 for obtaining a second assembly A2 (see FIG. 13) in which the first assembly A1 and the first seal member 7A that seals the opening at one end of the outer ring 2 in the axial direction are combined;
- a third step P3 for obtaining a third assembly in which the second assembly A2, the inner ring 3, and the second roller cassette 9B are combined; and
- a fourth step P4 for assembling the second seal member 7B to the third assembly.

Note that, in practice, a first grease filling step for filling the first raceway 12 with grease is performed between the second step P2 and the third step P3, and a second grease filling step for filling the second raceway 13 with grease is performed between the third step P3 and the fourth step P4. However, both grease filling steps are not illustrated in FIG. 4.

Hereinafter, the first step P1 and the second step P2, which are the gist of the assembling method according to the present invention, will be described in detail with reference to the drawings (FIGS. 5 to 13).

[First Step P1]

Figure 5:
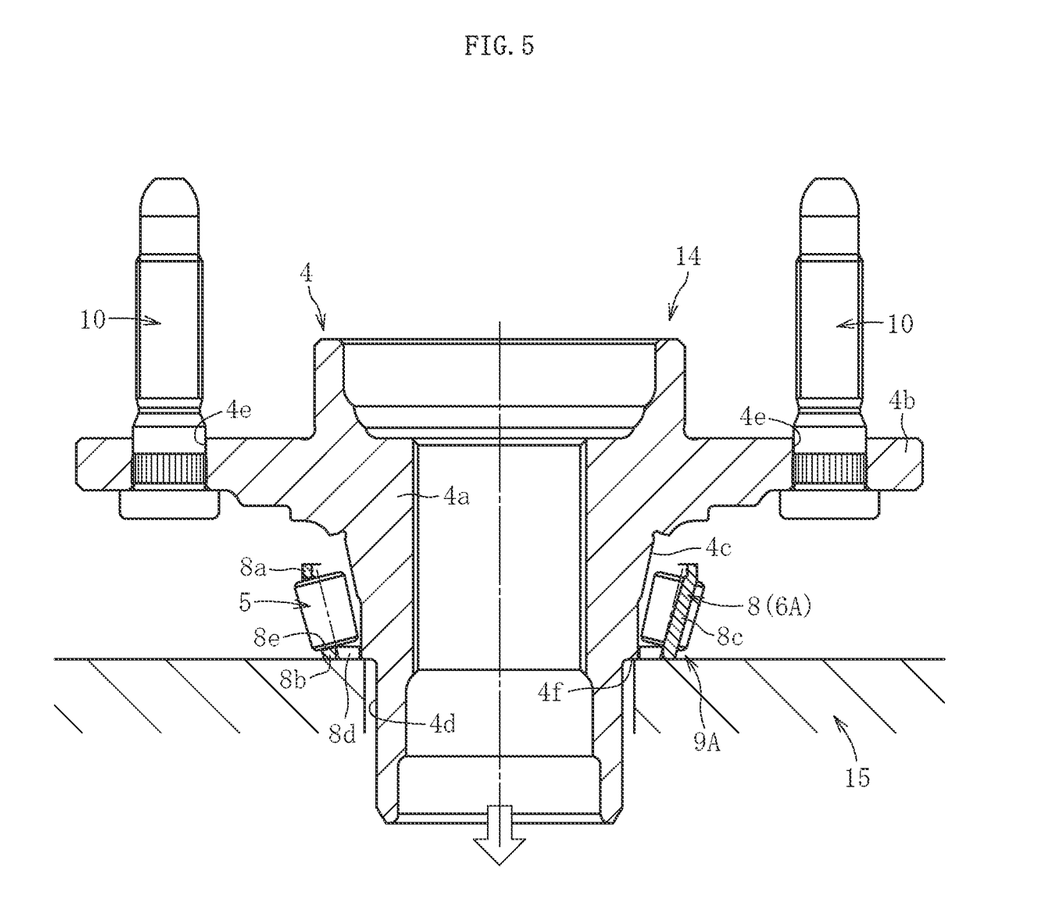
FIG. 5 is a longitudinal sectional view illustrating an intermediate stage of a first step.

In the first step P1, first, the first roller cassette 9A is produced. As illustrated in FIG. 5, the first roller cassette 9A is completed by placing the general-purpose cage 8, which serves as the first cage 6A, in a vertical orientation with the small-diameter annular portion 8b on the lower side, and then incorporating one tapered roller 5 into each pocket 8e of the general-purpose cage 8. By producing the roller cassette 9A in this manner, it is possible to prevent the tapered rollers 5 from falling off radially inward of the general-purpose cage 8. Note that the second roller cassette 9B is also produced in the same procedure as the first roller cassette 9A.

Figure 6:
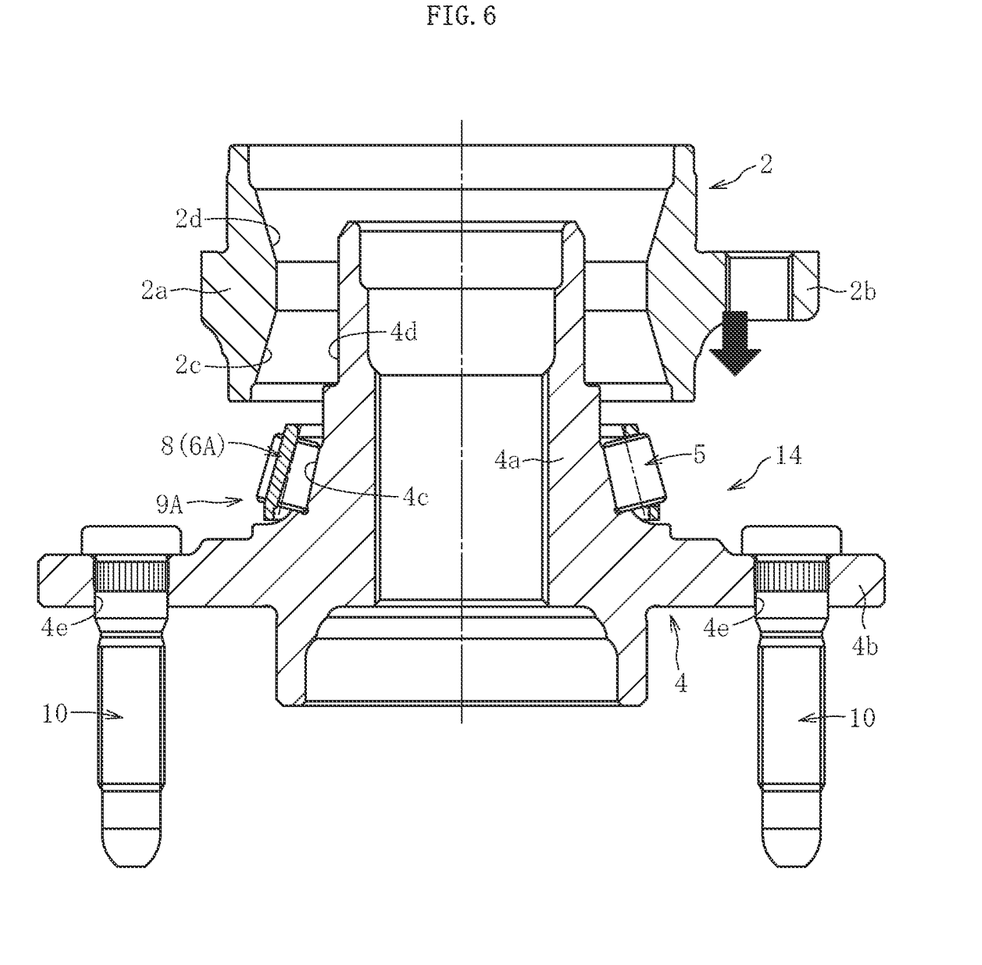
FIG. 6 is a longitudinal sectional view illustrating a state just before the end of the first step.

Next, as illustrated in FIG. 5, the cylindrical portion 4a of the hub wheel 4 is inserted into the inner periphery of the first roller cassette 9A through the upper opening of the first roller cassette 9A, thereby producing a subassembly 14 in which the first roller cassette 9A and the hub wheel 4 are combined. The subassembly 14 is turned upside down while the disassembly thereof (relative separation movement between the hub wheel 4 and the first roller cassette 9A) is restricted (for example, while the flange 4b of the hub wheel 4 and the first cage 6A are held by a chuck mechanism). The subassembly 14 is then positioned with the flange 4b of the hub wheel 4 on the lower side, as illustrated in FIG. 6. Note that the above-described operations of producing the first roller cassette 9A and the subassembly 14 as described above are performed while the small-diameter annular portion 8b of the general-purpose cage 8 is supported from below by a support member 15. The support member 15 may be the claw member of the chuck mechanism or other members.

Then, as illustrated in FIG. 6, the outer ring 2 in a vertical orientation with the first outer raceway surface 2c on the lower side is placed on top of the subassembly 14 in a vertical orientation with the flange 4b of the hub wheel 4 on the lower side, and then the two are moved close to each other, so that the first roller cassette 9A is positioned between the first outer raceway surface 2c and the first inner raceway surface 4c, thereby combining the outer ring 2 and the subassembly 14. As a result, the first assembly A1 (see FIG. 8 and the like) in which the outer ring 2, the hub wheel 4, and the first roller cassette 9A are combined is obtained.

[Second Step P2]

Figure 7:
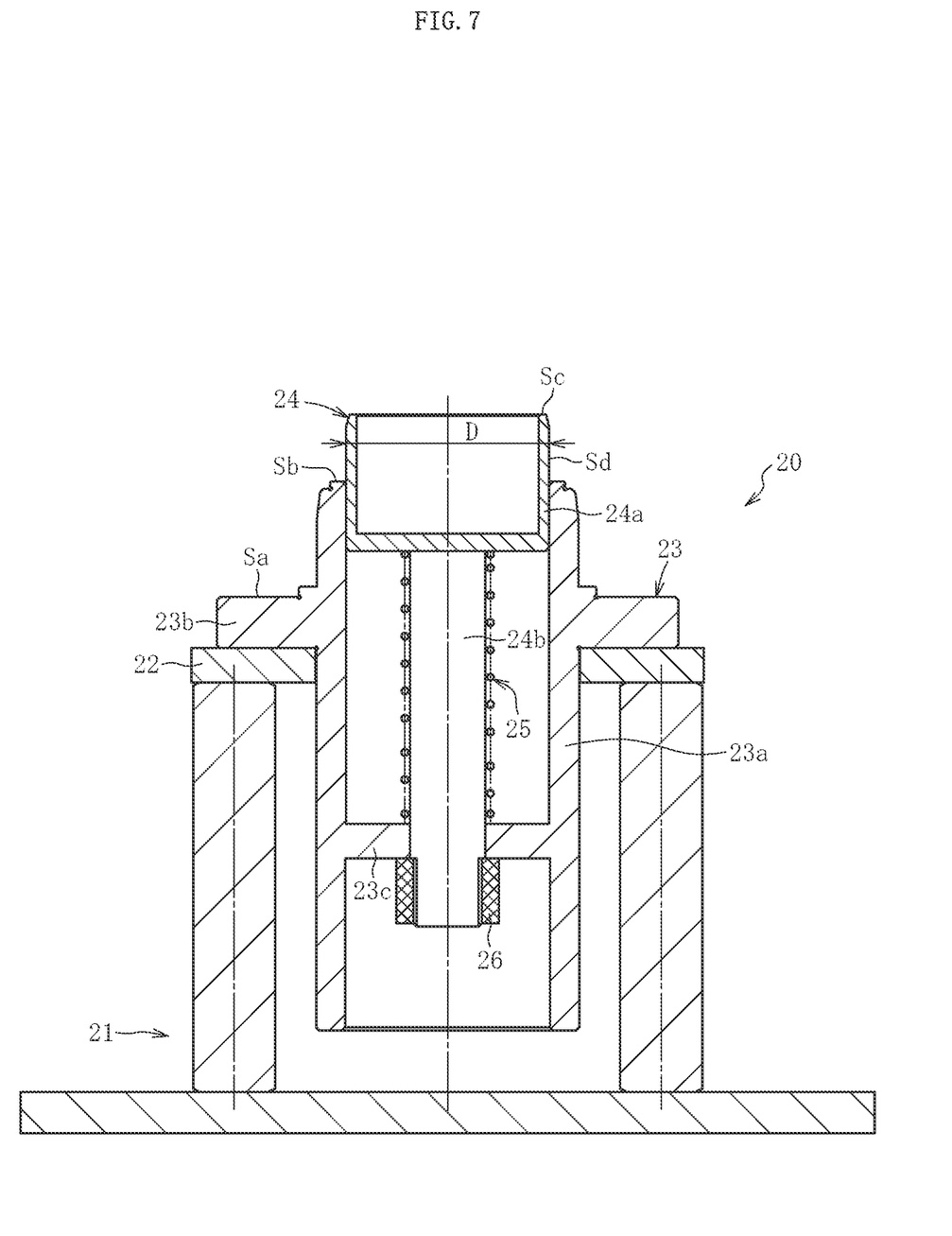
FIG. 7 is a longitudinal sectional view illustrating an overall configuration of the assembling device.

The second step P2 is performed using an assembling device 20 illustrated in FIG. 7. The assembling device 20 includes a base member 21, a stationary first support tool 23 that is supported by the base member 21 with a spacer member 22 interposed therebetween, a movable second support tool 24 that moves vertically with respect to the first support tool 23, a coil spring (compression coil spring) 25 that serves as an elastic member, and a nut member 26.

Figure 8:
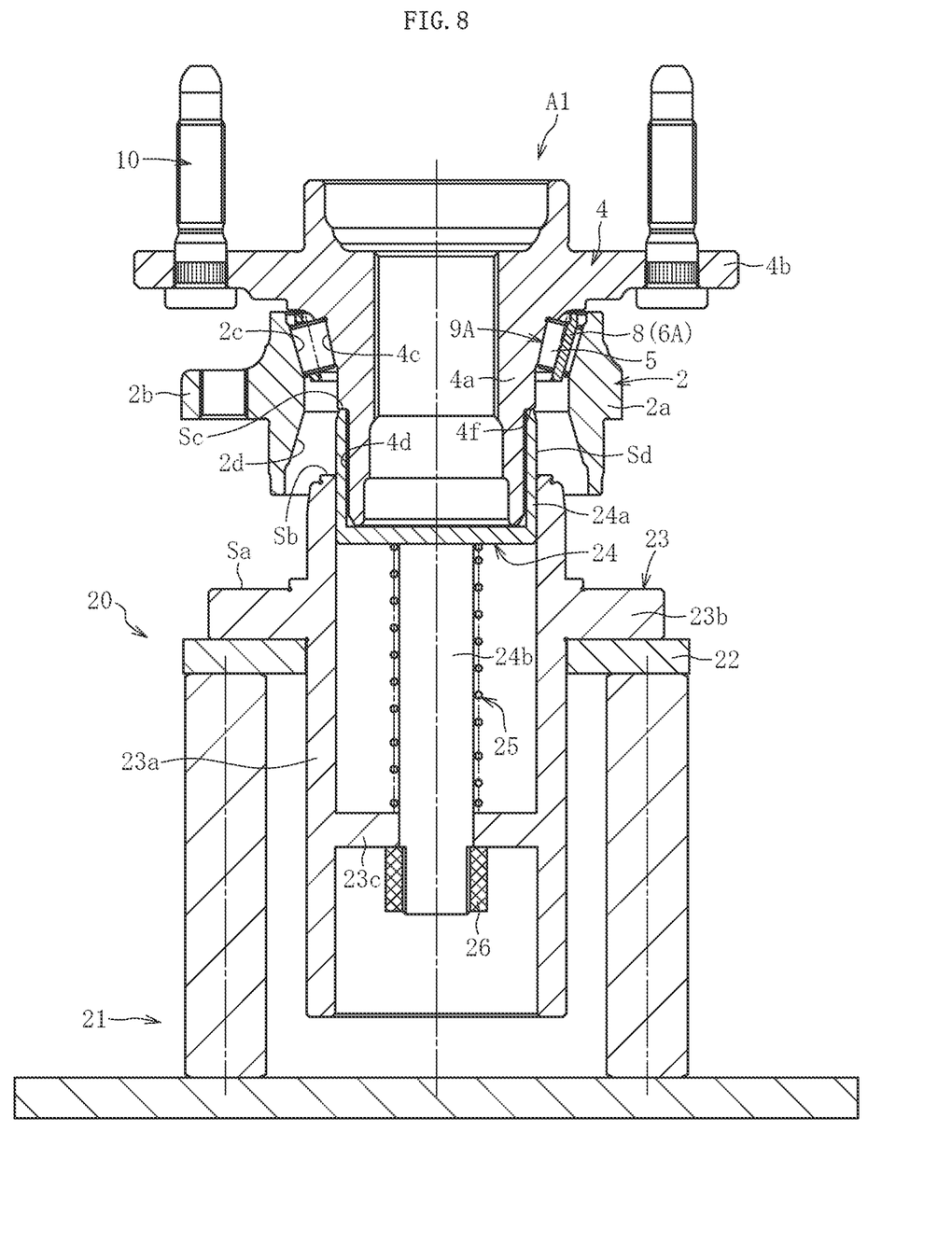
FIG. 8 is a longitudinal sectional view illustrating a start stage of a second step.

The first support tool 23 has a cylindrical portion 23a, a flange portion 23b that extends radially outward from the outer peripheral surface of the cylindrical portion 23a, and an engagement portion 23c that extends radially inward from the inner peripheral surface of the cylindrical portion 23a and is engageable with the nut member 26. The flange portion 23b is provided with an outer ring support surface Sa capable of supporting, from below, the other axial end of the cylindrical portion 2a of the outer ring 2 of the first assembly A1 (specifically, the first assembly A1 in a vertical orientation with the outer ring 2 below the flange 4b of the hub wheel 4, as illustrated in FIG. 8) set in the assembling device 20. In addition, the cylindrical portion 23a is provided with a cage support surface Sb capable of supporting, from below, the other axial end of the first cage 6A of the first roller cassette 9A that constitutes the first assembly A1. Note that the first support tool 23 is not provided with a support surface for supporting the tapered rollers 5 that constitute the first roller cassette 9A. That is, the tapered rollers 5 constituting the first assembly A1 are not supported by the first support tool 23 during the execution of the second step P2.

Figure 11:
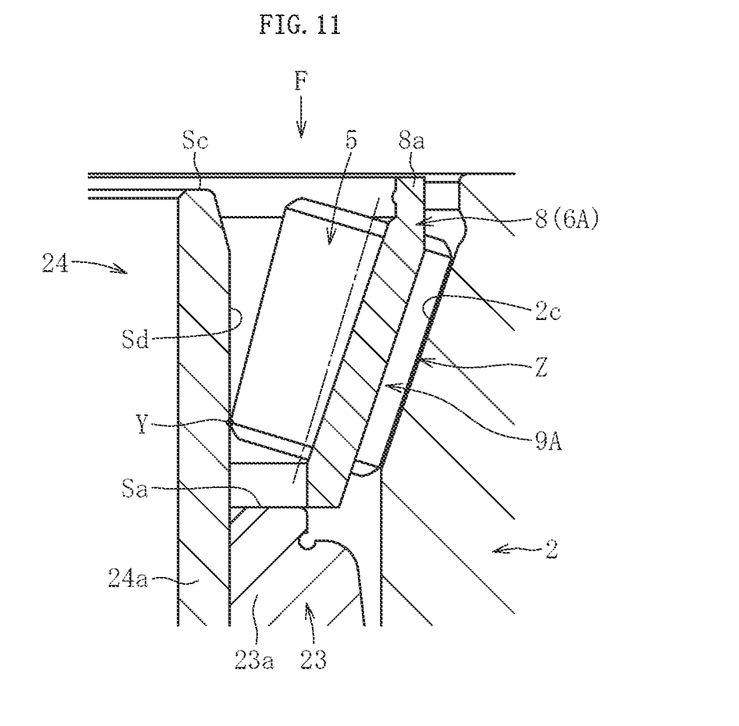
FIG. 11 is a partially enlarged view of FIG. 10.

In this manner, as illustrated in FIG. 11, the outer ring 2 and the first roller cassette 9A can be supported from below by the first support tool 23, with a gap Z interposed between the tapered rollers 5 and the first outer raceway surface 2c of the outer ring 2. This can effectively reduce the possibility of defects such as scratches occurring on the tapered rollers 5 and/or the first outer raceway surface 2c due to the tapered rollers 5 being pressed strongly against the first outer raceway surface 2c during the reinsertion of the cylindrical portion 4a of the hub wheel 4 into the inner periphery of the outer ring 2 in the second step P2 (details will be described later), for example.

The second support tool 24 has a bottomed cylindrical cup portion 24a with an opening at the top and a shaft portion 24b that extends axially outward (downward) from the outer bottom surface of the cup portion 24a, and the entire second support tool 24 is disposed radially inward of the cylindrical portion 23a of the first support tool 23. The free end of the shaft portion 24b protrudes below the engagement portion 23c of the first support tool 23, and the nut member 26 is fixed to the outer periphery of the protruding portion. This configuration restricts the separation of the first support tool 23 and the second support tool 24. The coil spring 25 serving as an elastic member is externally fitted to the shaft portion 24b, and is interposed between the cup portion 24a, and the engagement portion 23c of the first support tool 23. With this configuration, the second support tool 24 is elastically supported with respect to the first support tool 23 with the coil spring 25 interposed therebetween.

The second support tool 24 is provided with a hub wheel support surface Sc capable of supporting, from below, the cylindrical portion 4a of the hub wheel 4 that constitutes the first assembly A1. The hub wheel support surface Sc according to the present embodiment is constituted by the upper end surface (open end surface) of the cup portion 24a, and supports the shoulder surface 4f of the hub wheel 4. Furthermore, the cup portion 24a is provided with a cylindrical roller support surface Sd. In the present embodiment, on the outer peripheral surface of the cup portion 24a, the region protruding above the cage support surface Sb of the first support tool 23 in a state where no vertical load is applied to the second support tool 24 (state where the hub wheel 4 is not supported by the second support tool 24) functions as the roller support surface Sd.

The roller support surface Sd is a surface capable of supporting the plurality of tapered rollers 5, which constitute the first roller cassette 9A, from the radially inner side, in other words, the surface preventing the plurality of tapered rollers 5 from falling off radially inward. Therefore, the outer dimension D of the outer peripheral surface of the cup portion 24a, functioning as the roller support surface Sd, is set to the same dimension as or slightly smaller than the diameter of a roller inscribed circle Y illustrated in FIG. 12. The roller inscribed circle Y is a circular track that connects the inner ends on the other side (smaller end surface side) of the tapered rollers 5 in the axial direction.

The assembling device 20 generally has the above configuration, and the first assembly A1 obtained in the first step P1 is combined with the first seal member 7A as follows.

First, as illustrated in FIG. 8, the first assembly A1 in the vertical orientation with the outer ring 2 below the flange 4b of the hub wheel 4 (more specifically, the first assembly A1 held in the vertical orientation in a state where the relative separation movement of the outer ring 2 and the hub wheel 4 is restricted) is placed above the assembling device 20, and then the first assembly A1 is moved downward to set the first assembly A1 in the assembling device 20.

Figure 9:
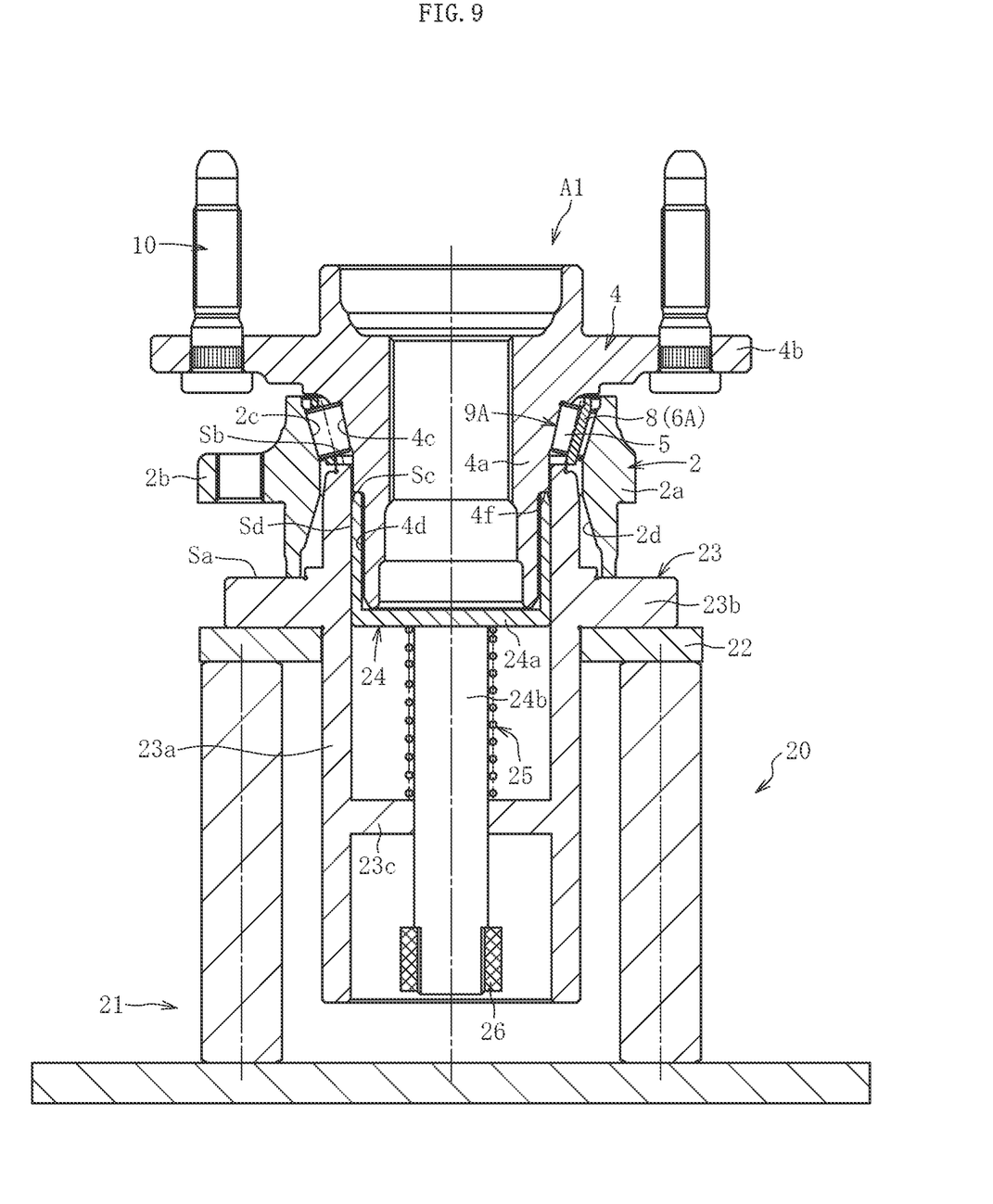
FIG. 9 is a longitudinal sectional view illustrating an intermediate stage of the second step.

When the first assembly A1 disposed above the assembling device 20 is moved downward, first, the shoulder surface 4f of the hub wheel 4 abuts on the hub wheel support surface Sc of the second support tool 24. As described above, the second support tool 24 is elastically supported with respect to the first support tool 23 with the coil spring 25 interposed therebetween. Therefore, after the hub wheel 4 abuts on the second support tool 24, the second support tool 24 moves downward relative to the first support tool 23 in accordance with the downward movement of the first assembly A1, and the coil spring 25 interposed between the first support tool 23 and the second support tool 24 is compressed (see FIG. 9). Then, as illustrated in FIG. 9, when the other axial end of the cylindrical portion 2a of the outer ring 2 of the first assembly A1 abuts on the outer ring support surface Sa of the first support tool 23 and the other axial end of the first roller cassette 9A (first cage 6A) of the first assembly A1 abuts on the cage support surface Sb of the first support tool 23, the downward movement of the first assembly A1 is stopped. As a result, the first assembly A1 is set in the assembling device 20 in a state where the outer ring 2 and the first roller cassette 9A are supported from below by the first support tool 23 and the cylindrical portion 4a of the hub wheel 4 is supported from below by the second support tool 24.

The above-described setting operation of the first assembly A1 to the assembling device 20 is performed in a state where the first inner raceway surface 4c of the hub wheel 4 is disposed radially inward of the first roller cassette 9A (state where the first roller cassette 9A is disposed between the first outer raceway surface 2c of the outer ring 2 and the first inner raceway surface 4c of the hub wheel 4). Therefore, the tapered rollers 5 do not fall off radially inward of the first cage 6A, which is the general-purpose cage 8, during the execution of this operation.

Figure 10:
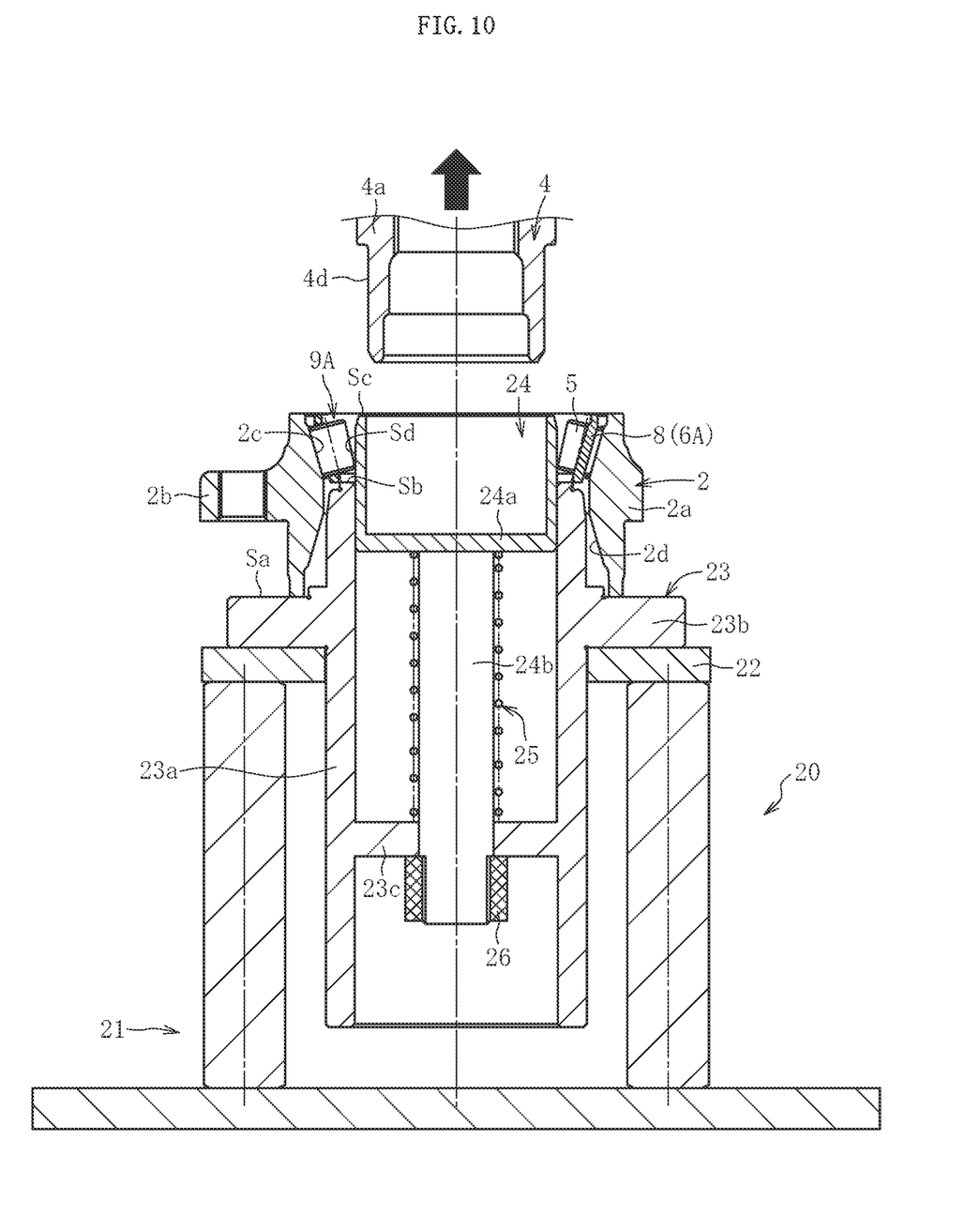
FIG. 10 is a longitudinal sectional view illustrating an intermediate stage of the second step.
Figure 12:
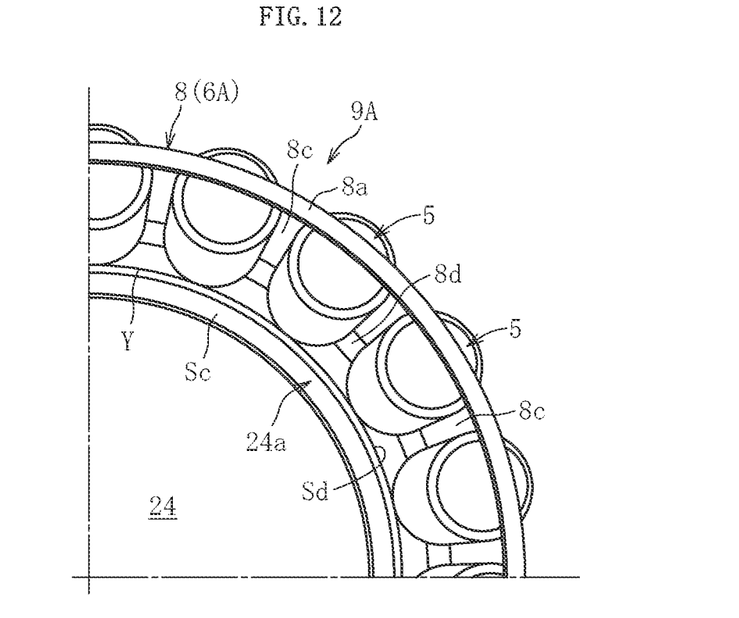
FIG. 12 is a partial plan view of FIG. 11 as viewed from the direction of arrow F in the drawing.

Next, as illustrated in FIG. 10, the hub wheel 4 (only) of the first assembly A1 set in the assembling device 20 is moved upward to separate (extract) the hub wheel 4 from the first assembly A1 set in the assembling device 20. When the hub wheel 4 is moved upward, at the same time, the vertical load applied to the second support tool 24, that is, the compressive load acting on the coil spring 25 is removed, so that the coil spring 25 is elastically stretched and deformed, and a force (elastic restoring force of the coil spring 25) for moving the second support tool 24 upward acts on the cup portion 24a of the second support tool 24. Therefore, when the hub wheel 4 is moved upward, the second support tool 24 moves upward relative to the first support tool 23 until returning to the origin (position shown in FIG. 7), in accordance with the upward movement of the hub wheel 4. Along therewith, as also illustrated in FIGS. 11 and 12, the cylindrical roller support surface Sd provided on the cup portion 24a of the second support tool 24 is introduced to the inside of the first roller cassette 9A in the radial direction.

The above-described separation (removal) operation of the hub wheel 4 is first performed in a state where the outer peripheral surface of the cylindrical portion 4a of the hub wheel 4 is disposed radially inward of the first roller cassette 9A, and subsequently performed in a state where the roller support surface Sd of the second support tool 24 is disposed radially inward of the first roller cassette 9A. Therefore, even during the execution of this operation, the tapered rollers 5 do not fall off radially inward of the first cage 6A.

Although not illustrated, after the hub wheel 4 is separated from the first assembly A1, the first seal member 7A is attached to one end of the outer ring 2 in the axial direction in the state illustrated in FIGS. 10 and 11, that is, with the cylindrical roller support surface Sd disposed radially inward of the first roller cassette 9A.

Although not illustrated, when the attachment operation of the first seal member 7A to the outer ring 2 is completed, the cylindrical portion 4a of the hub wheel 4 (the hub wheel 4 separated from the first assembly A1) is reinserted into the inner periphery of the outer ring 2. As a result, the second assembly A2 illustrated in FIG. 13, that is, the second assembly A2 in which the outer ring 2, the hub wheel 4, the first seal member 7A, and the first roller cassette 9A are combined, is obtained.

As described above, in the present embodiment, since the coil spring 25 serving as an elastic member is interposed between the second support tool 24 and the first support tool 23, when a vertical load acts on the second support tool 24 as the cylindrical portion 4a of the hub wheel 4 is reinserted into the inner periphery of the outer ring 2, the second support tool 24 moves downward in accordance with the reinsertion of the cylindrical portion 4a of the hub wheel 4, similarly to the case of setting the first assembly A1 in the assembling device 20 (see FIGS. 8 and 9). Therefore, during the reinsertion of the cylindrical portion 4a of the hub wheel 4 into the inner periphery of the outer ring 2, while the cylindrical roller support surface Sd provided on the second support tool 24 is ejected below the first roller cassette 9A, (the first inner raceway surface 4c formed on) the cylindrical portion 4a of the hub wheel 4 is introduced to the inside of the first roller cassette 9A in the radial direction.

The attachment operation of the first seal member 7A and the reinsertion operation of the cylindrical portion 4a of the hub wheel 4 as described above are first performed in a state where the cylindrical roller support surface Sd is disposed radially inward of the first roller cassette 9A, and subsequently performed in a state where the outer peripheral surface of the cylindrical portion 4a of the hub wheel 4 is disposed radially inward of the first roller cassette 9A. Therefore, even during the execution of these operations, the tapered rollers 5 do not fall off radially inward of the first cage 6A.

[Third Step P3 and Fourth Step P4]

Although not illustrated, in the third step P3, the second roller cassette 9B and the inner ring 3 are assembled to the second assembly A2 obtained as described above. Specifically, first, the second assembly A2 is turned upside down, and then the second roller cassette 9B and the inner ring 3 are inserted between the second outer raceway surface 2d of the outer ring 2 and the inner ring attachment surface 4d of the hub wheel 4. Next, the other axial end of the cylindrical portion 4a of the hub wheel 4 is bent radially outward to form the swaged portion 11. As a result, the third assembly in which the second roller cassette 9B and the inner ring 3 are assembled to the second assembly A2 is obtained. Then in the fourth step P4, the second seal member 7B is incorporated between the outer ring 2 and the inner ring 3 that constitute the third assembly. As a result, the hub bearing 1 illustrated in FIG. 1 is completed.

As described above, with the assembling method (and assembling device) for the hub bearing 1 according to the present invention, even if the general-purpose cage 8 illustrated in FIGS. 2 and 3 is employed as the first cage 6A constituting the first roller cassette 9A, the assembly operation of the hub bearing 1 can be performed while preventing the tapered rollers 5 from falling off from the first cage 6A until the second assembly A2 which structurally, substantially eliminates the possibility that the tapered rollers 5 constituting the first roller cassette 9A fall off radially inward of the first cage 6A is produced. Therefore, it is possible to simultaneously achieve a reduction in component costs by employing the general-purpose cage 8 as the first cage 6A and achieve improved ease of assembly by preventing the tapered rollers 5 from falling off during the assembly operation of the hub bearing 1.

In addition, since the first support tool 23 and the second support tool 24 used in the second step P2 support, from below, the first assembly A1 in which the outer ring 2, the hub wheel 4, and the first roller cassette 9A are combined, there is no time and effort for assembling as in the case of employing the retaining ring described in Patent Literature 2. Furthermore, since the second support tool 24 provided with the cylindrical roller support surface Sd moves vertically relative to the first support tool 23 in a state where separation from the first support tool 23 is restricted, there is no need to provide a retaining ring recovery step or recovery device which is indispensable when the retaining ring is employed. In view of the above, the assembling method and assembling device for the hub bearing 1 according to the present invention can greatly contribute to cost reduction of the hub bearing 1.

Although one embodiment of the present invention has been described above, the embodiment of the present invention is not limited thereto.

For example, in the embodiment described above, the coil spring 25 is interposed between the stationary first support tool 23 and the movable second support tool 24, and the second support tool 24 is vertically moved with the expansion and contraction deformation of the coil spring 25. However, it is also possible to vertically move the second support tool 24 in a different method. Specifically, for example, it is conceivable to couple the second support tool 24 to the output member of a linear actuator and vertically move the second support tool 24 by linearly moving the output member. Note that, in view of the configuration of the present invention, it is important to move the second support tool 24 downward at the same time as a vertical load is applied to the second support tool 24, and then move the second support tool 24 upward at the same time as the vertical load is removed. Therefore, when a linear actuator is employed in place of the elastic member (coil spring 25), for example, a pressure sensor, a load sensor, or the like is preferably installed in the second support tool 24.

In a case where the linear actuator as described above is employed to vertically move the first support tool 23 and the second support tool 24 relative to each other, the first support tool 23 can be the movable side, and the second support tool 24 can be the stationary side. That is, if the linear actuator is coupled to the first support tool 23 and the first support tool 23 is vertically moved with respect to the second support tool 24 at the appropriate timing, the hub bearing 1 (second assembly A2) can be assembled in the same manner as the embodiment described above.

The present invention is not limited to the above-described embodiments at all, and can be implemented in various forms without departing from the gist of the present invention. That is, the scope of the present invention is defined by the claims, and includes equivalent meanings described in the claims and all modifications within the scope.

REFERENCE SIGNS LIST

1 Hub bearing
2 Outer ring
2c First outer raceway surface
2d Second outer raceway surface
3 Inner ring
3a Second inner raceway surface
4 Hub wheel
4a Cylindrical portion
4b Flange
4c First inner raceway surface
4f Shoulder surface
5 Tapered roller
6A First cage (cage)
7A First seal member (seal member)
8 General-purpose cage
9A First roller cassette
20 Assembling device
23 First support tool
24 Second support tool
25 Coil spring (elastic member)
A1 First assembly
A2 Second assembly
P1 First step
P2 Second step
Sa Outer ring support surface Sb Cage support surface
Sc Hub wheel support surface
Sd Roller support surface
Y Roller inscribed circle

The invention claimed is:

1. An assembling method for a hub bearing including
an outer ring having an inner peripheral surface on which a first outer raceway surface and a second outer raceway surface are formed,
an inner ring having an outer peripheral surface on which a second inner raceway surface facing the second outer raceway surface is formed,
a hub wheel integrally having a cylindrical portion having an outer peripheral surface on which a first inner raceway surface facing the first outer raceway surface is formed, and a flange that is provided on one side of the first inner raceway surface in an axial direction,
a roller cassette including a plurality of tapered rollers that are interposed between the first outer raceway surface and the first inner raceway surface and a cage that holds the plurality of tapered rollers at predetermined circumferentially spaced intervals, and
a seal member that seals an opening at one end of the outer ring in the axial direction, the assembling method comprising:
a first step for obtaining a first assembly in which the outer ring, the hub wheel, and the roller cassette are combined; and
a second step for obtaining a second assembly in which the first assembly and the seal member are combined,
wherein, in the second step,
the outer ring and roller cassette of the first assembly in a vertical orientation with the outer ring below the flange of the hub wheel are supported from below by a first support tool and the cylindrical portion of the hub wheel of the first assembly is supported from below by a second support tool that can be raised and lowered relative to the first support tool while being restricted from separating from the first support tool,
then the second support tool is moved upward relative to the first support tool in accordance with the separation of the hub wheel from the first assembly that is in the vertical orientation, so that a cylindrical roller support surface provided on the second support tool is introduced to an inside of the roller cassette in a radial direction, and
then, after the seal member is attached to the outer ring, the second support tool is moved downward relative to the first support tool in accordance with the re-insertion of the cylindrical portion of the hub wheel into an inner periphery of the outer ring, so that the first inner raceway surface is introduced to the inside of the roller cassette in the radial direction while the roller support surface is ejected below the roller cassette.

2. The assembling method for a hub bearing according to claim 1, wherein the second support tool is vertically moved relative to the first support tool by expansion and contraction deformation of an elastic member that is interposed between the first support tool and the second support tool.

3. The assembling method for a hub bearing according to claim 1, wherein the first support tool supports the roller cassette from below by supporting the cage without supporting the plurality of tapered rollers.

4. An assembling device for a hub bearing including
an outer ring having an inner peripheral surface on which a first outer raceway surface and a second outer raceway surface are formed,
an inner ring having an outer peripheral surface on which a second inner raceway surface facing the second outer raceway surface is formed,
a hub wheel integrally having a cylindrical portion having an outer peripheral surface on which a first inner raceway surface facing the first outer raceway surface is formed, and a flange that is provided on one side of the first inner raceway surface in an axial direction,
a roller cassette including a plurality of tapered rollers that is interposed between the first outer raceway surface and the first inner raceway surface and a cage that holds the plurality of tapered rollers at predetermined circumferentially spaced intervals, and
a seal member that seals an opening at one end of the outer ring in the axial direction, the assembling device comprising:
a first support tool that supports, from below, the outer ring and the cage of the roller cassette but does not support the plurality of tapered rollers of a first assembly in which the outer ring, the hub wheel, and the roller cassette are combined in a vertical orientation with the outer ring below the flange of the hub wheel; and
a second support tool that can be raised and lowered relative to the first support tool while being restricted from separating from the first support tool, and supports, from below, the cylindrical portion of the hub wheel but does not support the plurality of tapered rollers of the first assembly that is in the vertical orientation,
wherein the second support tool is moved upward relative to the first support tool in accordance with the separation of the hub wheel from the first assembly that is in the vertical orientation, until a cylindrical roller support surface provided on an outer peripheral surface of the second support tool is disposed radially inward of the roller cassette, and the second support tool is moved downward relative to the first support tool in accordance with the re-insertion of the cylindrical portion of the hub wheel into an inner periphery of the outer ring so that the roller support surface is ejected below the roller cassette.

* * * * *